(12) United States Patent
Quach et al.

(10) Patent No.: US 6,567,952 B1
(45) Date of Patent: May 20, 2003

(54) METHOD AND APPARATUS FOR SET ASSOCIATIVE CACHE TAG ERROR DETECTION

(75) Inventors: Nhon Toai Quach, San Jose, CA (US); Gregory S. Mathews, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/551,306

(22) Filed: Apr. 18, 2000

(51) Int. Cl.[7] .................. G06F 11/00; H03M 13/00
(52) U.S. Cl. ................ 714/800; 711/128; 711/144
(58) Field of Search .................. 714/800, 805, 714/6, 768, 773, 819, 30; 711/128, 144, 145, 3, 207, 136, 11.8, 122, 146, 205, 140; 365/49; 713/320

(56) References Cited

U.S. PATENT DOCUMENTS

| | | | | |
|---|---|---|---|---|
| 5,392,410 A | * | 2/1995 | Liu ................................ 711/3 |
| 5,894,487 A | * | 4/1999 | Levitan ...................... 714/819 |
| 6,038,693 A | * | 3/2000 | Zhang ........................ 714/768 |
| 6,292,906 B1 | * | 9/2001 | Fu et al. ........................ 714/6 |

* cited by examiner

*Primary Examiner*—Albert Decady
*Assistant Examiner*—Guy Lamarre
(74) *Attorney, Agent, or Firm*—Blakely, Sokoloff, Taylor & Zafman LLP

(57) ABSTRACT

An apparatus includes a plurality of error detection circuits. Each of the plurality of error detection circuits is coupled to one of a like plurality of ways in a set associative cache memory to receive a tag word and an error detection flag from the coupled way. Each of the plurality of error detection circuits generates a way error signal that is asserted if an error is detected in the tag word of the coupled way. A logical OR circuit is coupled to the plurality of error detection circuits to receive the plurality of way error signals. The logical OR circuit generates a tag error signal that is asserted if at least one of the plurality of way error signals is asserted.

20 Claims, 3 Drawing Sheets

METHOD AND APPARATUS FOR SET ASSOCIATIVE CACHE TAG ERROR DETECTION

BACKGROUND OF THE INVENTION

1. Field of the Invention

This invention relates to cache memories and, more particularly, to parity error detection for cache memories.

2. Background Information

It is axiomatic that data entering a data processor, whether originating in a local memory, or received from a remote source via a communication link, must be correct. For this reason many error detecting codes (EDC) are frequently used to insure the integrity of the information to be processed. For example, a parity bit may be added to units of data being stored in computer memories to detect a single bit error in the data unit when the unit is read.

To speed memory access, computers often use cache memory, which is a small high speed memory that provides fast access to a copy of the data in current use. Various schemes for managing data transfers between the main memory and the cache memory are well known in the art. All cache memories must provide a means for finding data associated with an address in the larger main memory in the smaller cache memory. One commonly used technique for constructing a cache memory is the set associative cache.

A set associative cache memory contains a predetermined number of cache lines, each line containing a predetermined number of bytes. The low order address bits are used to locate a line and a byte in the cache memory corresponding to any data byte in the main memory. However, there are many bytes of data in the main memory that have the same low order address bits and which would be located in the same place in the cache memory. Therefore, the unused high order address bit, termed the tag bits, are stored in an associated tag memory. When cache memory is accessed, the tag bits stored on the line being accessed are compared to the high order incoming address bits to see if the cache memory contains the byte being accessed. If the tag bits are the same as the high order address bits then there is a cache hit, the cache contains a copy of the main memory address being accessed. Thus, a cache memory read involves first reading the tag memory to see if the cache line contain the desired data, and then reading the data from the data memory if there is a hit.

Cache memory, like all memory, is subject to data corruption. Error detection is especially desirable in cache memory because the majority of memory accesses are likely to involve the cache memory in a well-designed system. It is important to detect errors in the tag memory because such errors render the tag comparison meaningless and lead to the possibility of accessing the incorrect unit of data or failing to access the most current data stored in the cache.

N-way set associative cache memories provide N locations, where N is 2 or more, that are accessed by the same low order address bits. This allows the number of conflicts for use of a storage location to be reduced because each main memory location can be located in 1 of N locations. When an N-way cache memory is accessed, N tags are retrieved and each tag is compared to the high order incoming address bits by 1 of N comparators to determine if any of the N ways of the cache memory contains the byte being accessed. The output of the N comparators generates a way selection value that indicates which of the N ways contains the byte being accessed if there is a cache hit. The way selection value causes an N to 1 multiplexer to select the data from the matching 1 of N data memories.

An N-way tag memory with parity error detection will store a parity bit for each entry in each of the N tag memories. It is known in the prior art to provide the way selection value to an N to 1 multiplexer to select the tag data from the appropriate 1 of N tag memories for parity checking of the tag value that generated the hit indication. If a parity error is detected, then an error signal is sent to the processor to indicate that the data provided are unreliable. Such errors are often fatal because it is difficult for the processor to provide correction of errors detected at the time that the data have been requested.

Accordingly, there is a need for a method and apparatus that allows cache tag errors to be detected before a data request is being fulfilled to increase the likelihood of correcting the detected error.

DETAILED DESCRIPTION OF THE INVENTION

Figure 1:
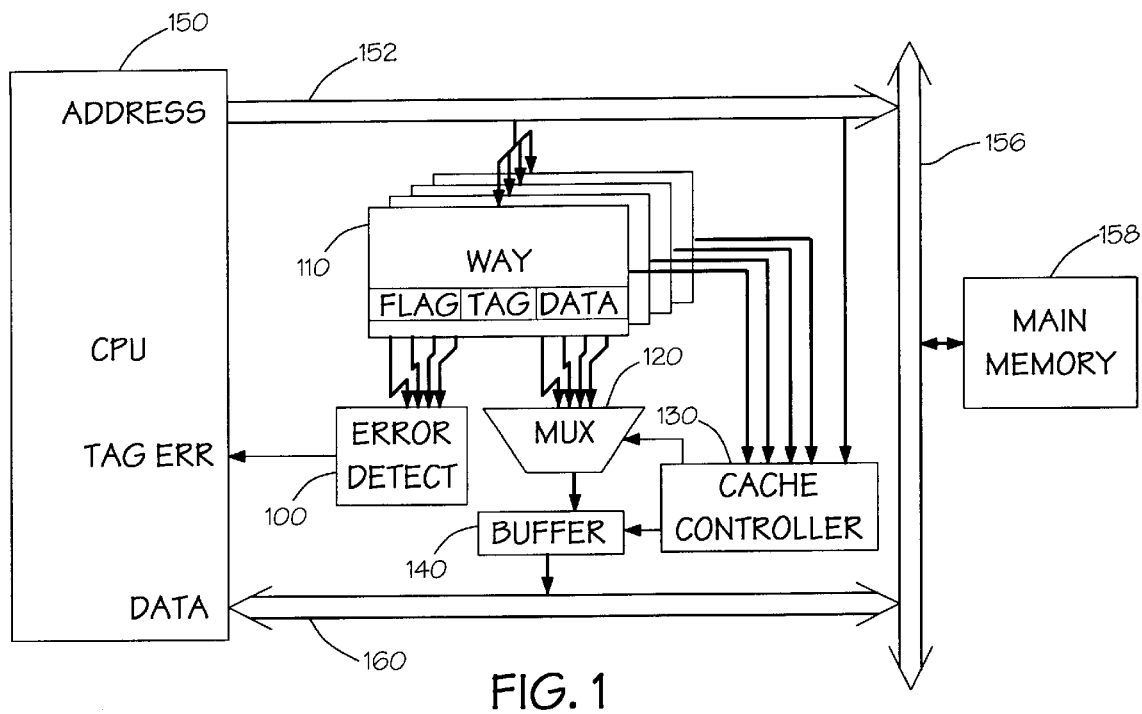
FIG. 1 is a block diagram of a computer system with a set associative cache employing an embodiment of the invention.
Figure 2:
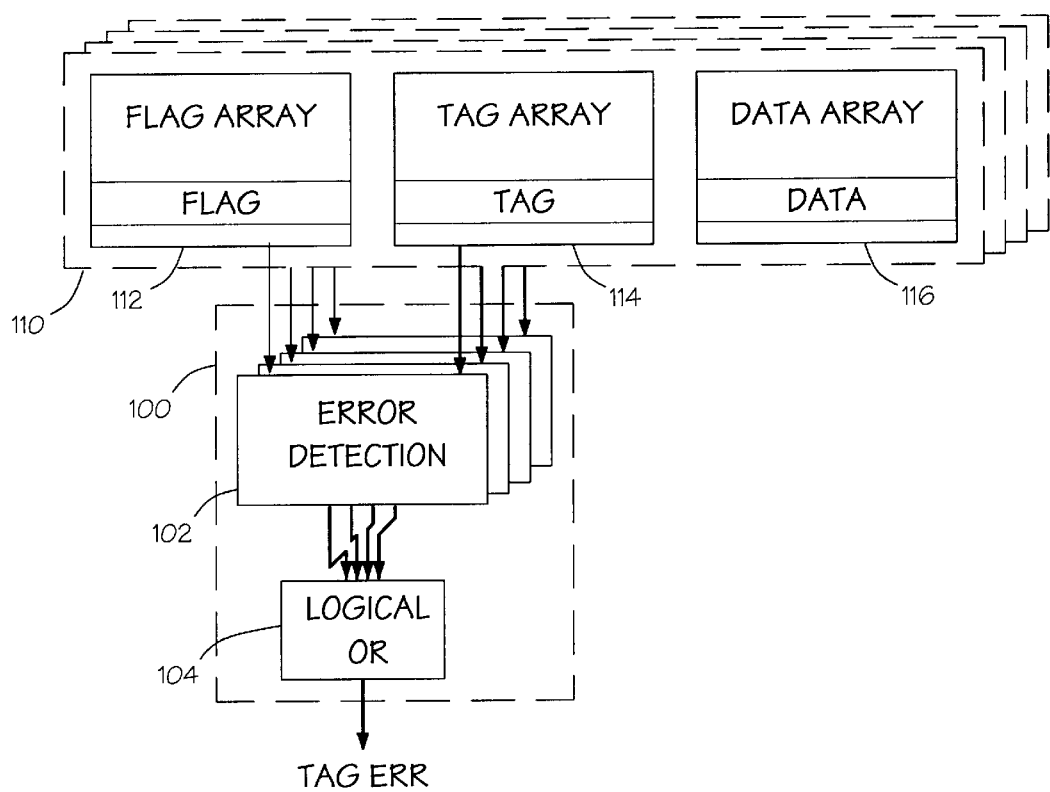
FIG. 2 is a block diagram of a portion of a set associative cache employing an embodiment of the invention.

FIGS. 1 and 2 illustrate an exemplary cache memory in a computer system. The cache memory includes a plurality of way arrays 110 that hold data words and associated tag words and flags. The ways are coupled to an address bus 152 from a central processing unit (CPU) 150 and through a multiplexer 120 and buffer 140 to a bidirectional data bus 160 connected to the CPU 150. A cache controller 130 controls the operation of the cache memory 110 and co-ordinates cache operations with CPU 150 memory accesses. Connections between the cache controller 130 and other elements that are not immediately relevant to the present invention have been omitted to avoid obscuring the disclosure of the invention. For example, the cache controller 130 will typically control an address bus driver and a data bus driver (not shown) to couple the CPU 150 to a system bus 156 when access to the main memory 158 is required and to decouple the CPU busses 152, 160 when the cache memory 110 can handle the memory transaction.

Cache memory 110 is organized in "lines." In a typical associative cache, each line includes a data word and associated tag and flag words. Each main memory address received on the address bus 152 can be viewed as having a low order portion termed the set bits and a high order portion termed the tag bits. The set bits are the bits required to address the cache memory 110. The set bits are further divided into an upper group of line bits and a lower group of byte bits. The line bits address a line of cache memory 110 and the byte bits address a byte within the data word of the line. All the main memory 158 locations that would be stored on the same cache line form a set. Because there will be many addresses in main memory 158 that have the same set address, the upper address bits for the data stored in a particular cache line are stored as tag bits in a tag array 114 to allow checking of the main memory address associated with a given cache line. Each line of data stored in the data array 116 has a one to one association with a tag word stored in the tag array 114 and a flag word stored in the flag array 112. It will be appreciated that the data array 116, tag array 114, and flag array 112 may all be provided by a single memory array and that the organization as three arrays is merely a logical division to more clearly show the different uses made of the information stored in various parts of the array. It will be further appreciated that the three arrays may be divided in various ways between different physical memory arrays without limiting the present invention.

In a set associative cache, searching for a data match is simplified because the cache lines from only one set need be checked. Each cache line is divided into fields that include a tag field indicative of the upper portion of address of the memory block, and a data field that stores the data at the memory location associated with the tag field. The tag field is typically stored in a tag array and the data field is stored in a data array. If a memory access occurs at a predetermined address, then the computer usually first checks the cache tag array to determine if a "hit," a match between the predetermined address and the address of the data stored in the cache, has occurred. If a hit occurs during execution of a read operation, then the data word can be read from the cache line without a time-consuming main memory 158 access. When a write operation is directed to the cache, the data are written to the cache line in the data array 116 and the upper portion of the address is stored in the cache line in the tag array 114. The data and tags may be stored in separate memory arrays to allow the tag to be checked quickly to decide if the cache line contains the addressed memory data. The tag array 114 is generally smaller and, therefore, faster than the data array 116.

Errors can occur during the storage of digital values in memory for various reasons including background cosmic radiation and alpha particle bombardment. Such errors invert a data bit, changing it from a binary 1 to a binary 0, or from a binary 0 to binary 1. Invalid output can be fatal. An error in the tag array can result in a data word not being recognized as holding the data for a requested address or erroneous identification of a data word as being at a requested address. To increase the reliability of a computer system, it is desirable to verify the integrity of tag information stored in the cache, to guard against the small but distinct possibility that a stored tag may have been altered in some way.

Parity checking may be used to detect a single bit error in a tag. The "parity" of computer data is defined by the number of asserted bits in a binary representation of the data. If a data unit has an even number of asserted bits, then an "even parity" results. But if the data unit has an odd number of asserted bits, then the data unit has an "odd parity." A "parity bit" is usually appended to the computer data unit to provide a pre-selected parity. For example, if the parity is predetermined to be "even" for each line of computer data in the cache, then the parity bit gives the data unit an even parity by either asserting or clearing the parity bit according to the number of asserted bits in the data unit. Multiple bit errors in the tag words can be detected by use of multi-bit flags with error detecting methods such as Hamming codes. The error detecting method employed does not limit the present invention.

The present invention provides an error detection circuit 102 for each way 110 in the cache memory. The error detection circuits 102 receive a tag word and flags for the cache line selected in each of the ways and generate a way error signal that is asserted if an error is detected from the received tag word and flags. There are, therefore, the same number of way error signals as there are ways.

The plurality of way error signals are provided to a logical OR circuit that generates a tag error signal that is asserted if one or more of the way error signals are asserted. The logical OR circuit may be provided in a variety of forms as are known to those skilled in the art. The logical OR circuit may be a circuit that receives the way error signals from each of the ways as inputs and provides a single active output that is the logical OR of the input. The sense of the inputs and the outputs may either be the same or may be opposite of each other, sometimes termed a logical NOR circuit. The logical OR circuit may also be an implied OR circuit wherein the way error signal of each of the plurality of error detection circuits is active only if the way error signal is asserted and all of the way error signals are coupled to generate the tag error signal. An implied OR may be provided without using active circuits in the logical OR circuit. The tag error signal is provided to the processor and may initiate an error routine to provide an appropriate recovery from the detected error in the cache tag array.

Figure 3:
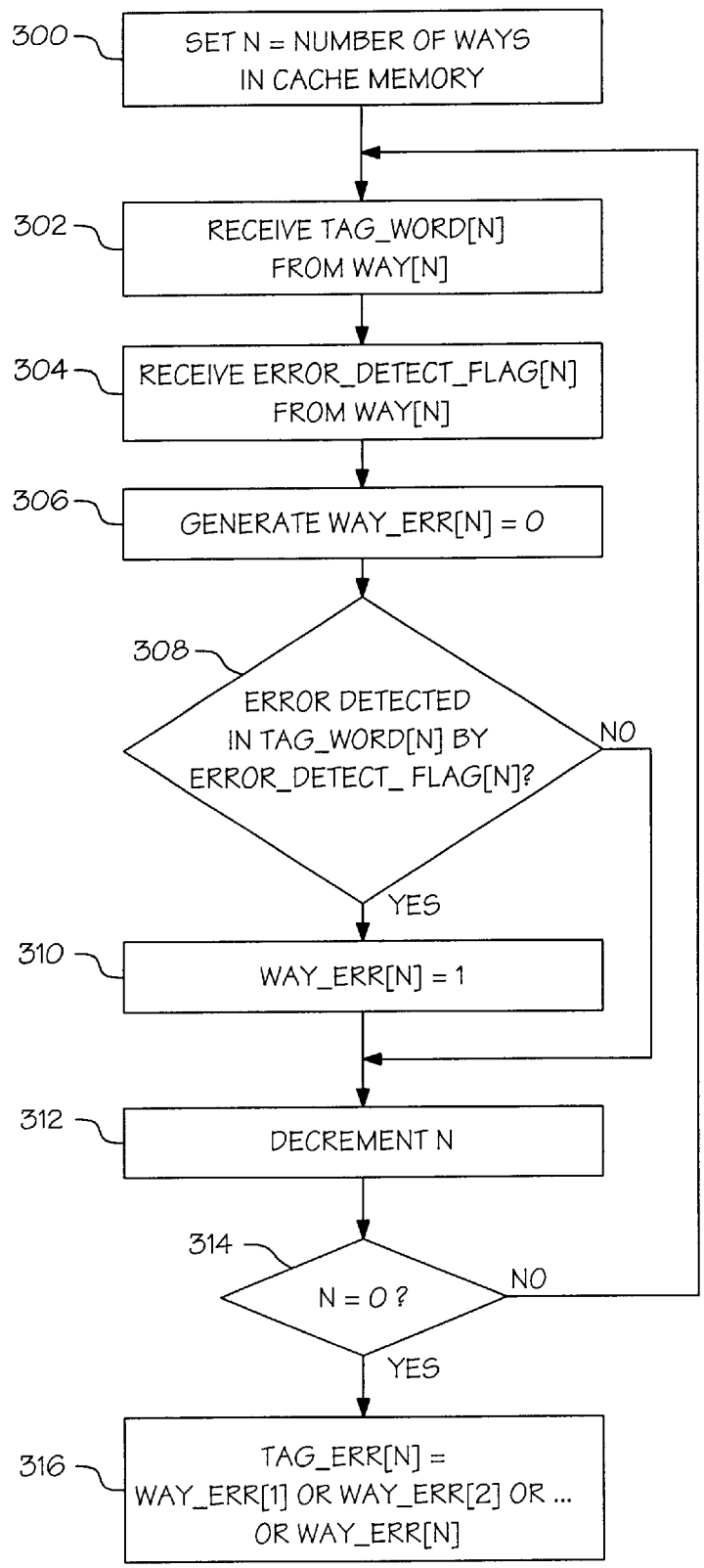
FIG. 3 is a flow chart of a method that embodies the invention.

FIG. 3 is a flowchart that illustrates an embodiment of the method of determining a tag error according to the present invention. The method is shown as including operations 302, 304, 306, 308, 310 that are iteratively performed on each of N ways in the set associative cache memory. It will be observed by those of ordinary skill in the art that these iterated operations could also be performed in parallel for all or some of the ways. A value N is initialized to the number of ways in the cache memory 300. A tag word 302 and an error detection flag 304 are received from the Nth way. An Nth way error is generated 306 and asserted 310 if an error is detected as determined by the Nth tag word and the Nth error detection flag 308. It will be appreciated that the error detection flag may also provide some error correction information. The value N is decremented 312. If N is not zero 314 the sequence of operations continues with receiving a tag word 302 for the next way in the cache memory. If N is zero 314, indicating that a way error signal has been generated for each of the N ways, a tag error signal is generated by ORing together each of the N way error signals 316.

Figure 4:
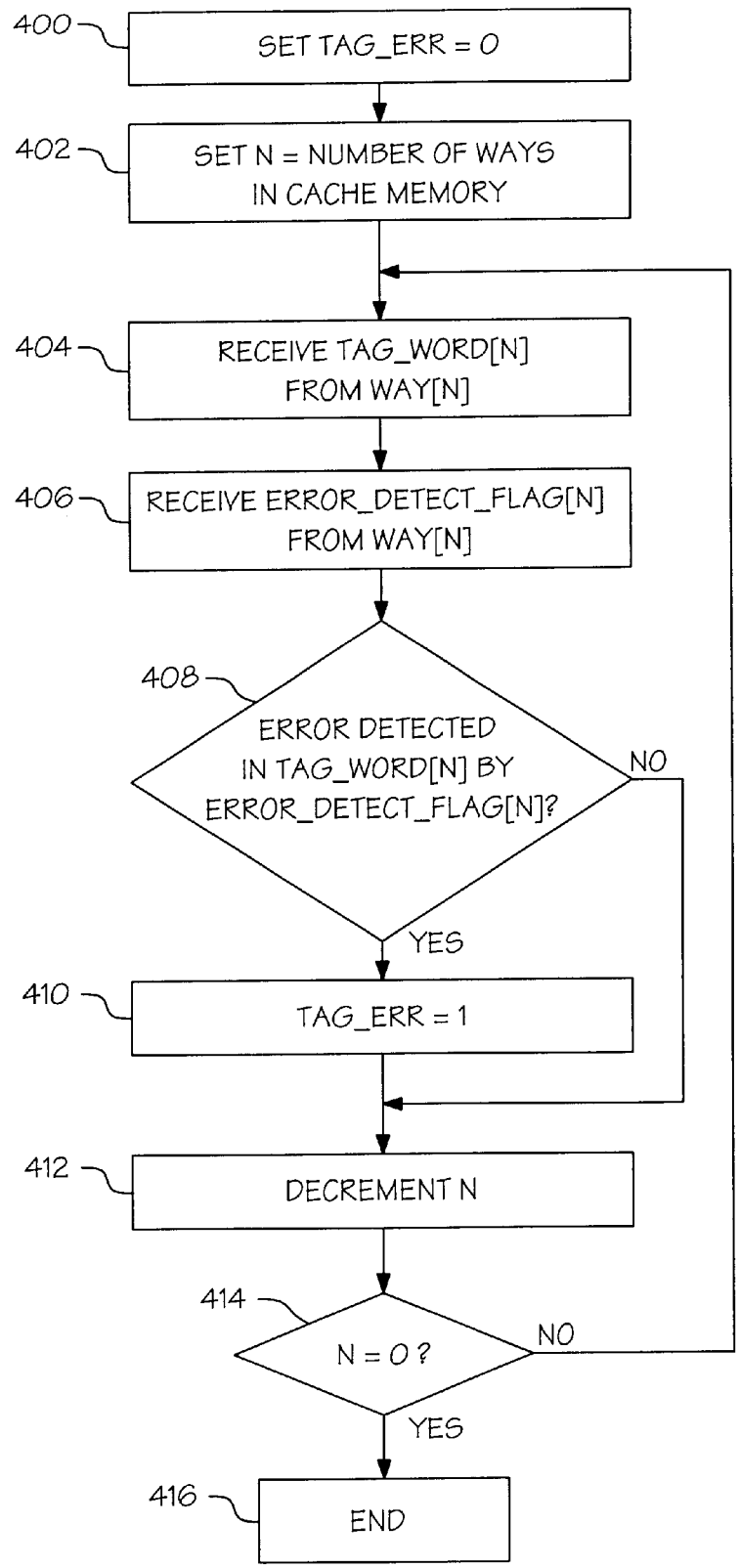
FIG. 4 is a flow chart of another method that embodies the invention.

FIG. 4 is a flowchart that illustrates another embodiment of the method of determining a tag error according to the present invention. A tag error value is initialized to zero 400.

Zero is used to indicate a non-asserted level that may be a high or low level as determined by a particular embodiment. Alternate embodiments may represent a non-asserted level as the value one. A value N is initialized to the number of ways in the cache memory 402. A tag word 404 and an error detection flag 406 are received from the Nth way. The tag error value is asserted 410 if an error is detected as determined by the Nth tag word and the Nth error detection flag 408. The value N is decremented 412. If N is not zero 414 the sequence of operations continues with receiving a tag word 404 for the next way in the cache memory. If N is zero 414, indicating that each of the N ways has been checked for errors, the method ends 416.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art. In particular, the invention is not limited to use in 4-way set associative cache memories, nor is it limited to the use of parity error detection.

What is claimed is:

1. An apparatus comprising:
  a plurality of error detection circuits, each of the plurality of error detection circuits coupled to one of a like plurality of ways in a set associative cache memory to receive a tag word and an error detection flag from the coupled way, each of the plurality of error detection circuits to generate a way error signal that is asserted if an error is detected in the tag word of the coupled way; and
  a logical OR circuit coupled to the plurality of error detection circuits to receive the plurality of way error signals, the logical OR circuit to generate a tag error signal that is asserted if at least one of the plurality of way error signals is asserted.

2. The apparatus of claim 1 wherein each of the plurality of error detection flags is a parity bit and each of the plurality of error detection circuits is a parity error detection circuit.

3. The apparatus of claim 1 wherein each of the plurality of error detection flags is a multi-bit value and each of the plurality of error detection circuits is a circuit for detecting multiple bit errors.

4. The apparatus of claim 1 wherein the logical OR circuit uses logical NOR logic.

5. The apparatus of claim 1 wherein the logical OR circuit is an implied OR circuit wherein the way error signal of each of the plurality of error detection circuits is active only if the way error signal is asserted and all of the way error signals are coupled to generate the tag error signal.

6. A method comprising:
  receiving a tag word from each of a plurality of ways in a set associative cache memory;
  receiving an error detection flag from each of the plurality of ways in the set associative cache memory; and
  generating a tag error signal that is asserted if an error is detected in the tag word as determined by the associated error detection flag for at least one of the plurality of ways.

7. The method of claim 6 further including instructions for:
  generating a like plurality of way error signals, each of the plurality of way error signals being asserted if an error is detected in the associated tag word as determined by the associated error detection flag; and
  asserting the tag error signal if at least one of the plurality of way error signals is asserted.

8. The method of claim 7 wherein each of the plurality of error detection flags is a parity bit and generating each of the plurality of way error signals further includes:
  determining the parity of one of the plurality of tag words;
  comparing the parity of the one of the plurality of tag words to the associated error detection flag; and
  asserting the associated one of the plurality of way error signals if the comparing indicates a parity error.

9. The method of claim 7 wherein each of the plurality of error detection flags is a multi-bit value and generating each of the plurality of way error signals further includes asserting the associated one of the plurality of way error signals if an error is indicated in one or more of the bits of the tag word and error detection flag.

10. The method of claim 6 wherein receiving a tag word and receiving an error detection flag is performed substantially simultaneously for at least two of the plurality of ways in the set associative cache memory.

11. A set associative cache memory comprising:
  a plurality of ways coupled to receive a tag address, each way including a tag array to store a plurality of tag words and a flag array to store a plurality of error detection flags, each way to provide one of the plurality of tag words and an associated one of the plurality of error detection flags as determined by the tag address;
  a plurality of error detection circuits, each of the plurality of error detection circuits coupled to the tag array and to the flag array in one of the plurality of ways, each of the plurality of error detection circuits to receive the one of the plurality of tag words and the associated one of the plurality of error detection flags from the one of the plurality of ways and to generate a way error signal that is asserted if an error is detected in the tag word; and
  a logical OR circuit coupled to the plurality of error detection circuits to receive the plurality of way error signals, the logical OR circuit to generate a tag error signal that is asserted if at least one of the plurality of way error signals is asserted.

12. The memory of claim 11 wherein each of the plurality of error detection flags is a parity bit and each of the plurality of error detection circuits is a parity error detection circuit.

13. The memory of claim 11 wherein each of the plurality of error detection flags is a multi-bit value and each of the plurality of error detection circuits is a circuit for detecting multiple bit errors.

14. The memory of claim 11 wherein the logical OR circuit uses logical NOR logic.

15. The memory of claim 11 wherein the logical OR circuit is an implied OR circuit wherein the way error signal of each of the plurality of error detection circuits is active only if the way error signal is asserted and all of the way error signals are coupled to generate the tag error signal.

16. A computer program embodied on a computer-readable medium, the computer program comprising instructions for:
  receiving a tag word from each of a plurality of ways in a set associative cache memory;

receiving an error detection flag from each of the plurality of ways in the set associative cache memory; and generating a tag error signal that is asserted if an error is detected in the tag word as determined by the associated error detection flag for at least one of the plurality of ways.

17. The computer program of claim 16 further including instructions for:

generating a like plurality of way error signals, each of the plurality of way error signals being asserted if an error is detected in the associated tag word as determined by the associated error detection flag; and asserting the tag error signal if at least one of the plurality of way error signals is asserted.

18. The computer program of claim 17 wherein each of the plurality of error detection flags is a parity bit and the instructions for generating each of the plurality of way error signals further includes instructions for:

determining the parity of one of the plurality of tag words;

comparing the parity of the one of the plurality of tag words to the associated error detection flag; and asserting the associated one of the plurality of way error signals if the comparing indicates a parity error.

19. The computer program of claim 17 wherein each of the plurality of error detection flags is a multi-bit value and the instructions for generating each of the plurality of way error signals further includes instructions for asserting the associated one of the plurality of way error signals if an error is indicated in one or more of the bits of the tag word and error detection flag.

20. The computer program of claim 16 wherein receiving a tag-word and receiving an error detection flag is performed substantially simultaneously for at least two of the plurality of ways in the set associative cache memory.

\* \* \* \* \*